(12) United States Patent
Glasgow et al.

(10) Patent No.: US 6,752,378 B2
(45) Date of Patent: Jun. 22, 2004

(54) VALVE ASSEMBLY WITH INTEGRAL SEAT

(75) Inventors: Jeffrey Glasgow, Jeanette, PA (US); William Zeravica, North Huntingdon, PA (US)

(73) Assignee: Westinghouse Airbrake Technologies Corporation, Wilmerding, PA (US)

( * ) Notice: Subject to any disclaimer, the term of this patent is extended or adjusted under 35 U.S.C. 154(b) by 203 days.

(21) Appl. No.: 10/050,011

(22) Filed: Jan. 14, 2002

(65) Prior Publication Data

US 2003/0132414 A1 Jul. 17, 2003

(51) Int. Cl.$^7$ ................................................. F16K 1/00
(52) U.S. Cl. ........................................ 251/368; 251/61.3
(58) Field of Search ............................. 251/61.2, 61.3, 251/61.4, 61.5, 120, 121, 368

(56) References Cited

U.S. PATENT DOCUMENTS

| 4,872,638 A | * | 10/1989 | Thompson et al. ........... 251/54 |
| 5,611,628 A | * | 3/1997 | Brouwer ....................... 384/220 |
| 5,769,387 A | * | 6/1998 | Perez C. ...................... 251/61.4 |

* cited by examiner

*Primary Examiner*—Edward K. Look
*Assistant Examiner*—John K. Fristoe, Jr.
(74) *Attorney, Agent, or Firm*—James Ray & Associates

(57) ABSTRACT

A valve seat apparatus comprised of a plastic material of sufficient mechanical rigidity for stable attachment to a stem assembly and acts as a carrier to transmit an actuating force within a valve body while possessing the resiliency required to provide a sealing surface and combines such sealing surface and carrier portion into a contiguous unit wherein interaction between the aforementioned valve seat apparatus and the corresponding sealing member within the valve body control the flow of fluid and fluid pressure.

18 Claims, 2 Drawing Sheets

VALVE ASSEMBLY WITH INTEGRAL SEAT

FIELD OF THE INVENTION

The present invention generally relates to a fluid or pressure controlling valve and, more particularly, this invention relates to a valve seat apparatus within a fluid or pressure controlling valve.

BACKGROUND OF THE INVENTION

As is well known throughout industry, including the railroad industry, valves are used in controlling flow and pressure of fluids provided by pumps and compressors. Fluid flows and pressures are conducted through such control valves via pipes, hoses and conduits connected to these valves.

A significant portion of these valves control pressure and flow of fluids by an interaction between the sealing surface of a moveable valve apparatus and a corresponding valve seat, each of which come together or separate to control the flow of a fluid from an inlet portion of a valve to an outlet portion of a valve.

Some of these interacting valve members involve a rigid carrier of metallic, or similarly suitable material, that provides a surface to attach an elastomer sealing member. The sealing member of rubber, or a similar elastomer, generally is bonded to the metallic carrier to provide a substantially flexible cushion that would conform to the surface of the corresponding sealing seat and create an effective seal.

The carrier, to which the sealing member is attached, is carried by rod or stem connected to a diaphragm or a solenoid to which the sealing member is forced against the corresponding sealing seat to create an effective seal against the flow or pressure of the fluid to be controlled. Consequently, the same carrier and sealing member retracts away from the corresponding sealing seat to effectively open the seal and permit the flow of the fluid being controlled. This compression and decompression of the sealing member, as well as repeated separations from the corresponding sealing seat contributes to accelerated delamination of the sealing member from the carrier. This separation of the sealing member from the carrier eventually may render the valve useless for controlling fluid flow or pressure.

It is generally required that fine machining and polishing of the surface of the metallic carrier be performed to improve attachment of the sealing member. Such machining and polishing of the carrier and the attachment of the sealing member to the carrier may substantially increase production cost of the component. In addition, a bonding agent compatible with both the carrier and the elastomer sealing member is indispensable. Errors in production or assembly of the sealing apparatus could contribute to loss of operation and failure.

SUMMARY OF THE INVENTION

As opposed to the prior art valve seat apparatus that is a combination of two separate components, the present invention provides a valve seat apparatus that provides both a sealing surface and carrier portion engageable with a stem assembly within a valve housing. Interaction between the valve seat apparatus and a corresponding sealing member within the valve housing control the flow of fluid and fluid pressure. The valve seat apparatus is comprised of a preselected plastic material that possesses at least sufficient mechanical rigidity for stable attachment to a stem assembly and transmission of an actuating force as well as provide a sealing surface with enough resilience to mate with the corresponding sealing member and establish an effective seal.

According to a second aspect, the present invention provides, in combination with a valve having a valve housing, a diaphragm and stem attached with a sealing surface disposed thereon, the improvement comprising a valve seat apparatus that combines a sealing surface and a carrier portion. Interaction between the valve seat apparatus and a corresponding sealing member within the valve housing control the flow of fluid and fluid pressure. The valve seat apparatus includes a preselected plastic material of sufficient mechanical rigidity to transmit an actuating force and allow stable attachment to a stem assembly yet is sufficiently resilient to facilitate a seal with the corresponding sealing member within the valve housing.

OBJECTS OF THE INVENTION

It is, therefore, a primary objective of this invention to provide a valve seat apparatus in which a carrier and sealing surface are constructed of one contiguous material for use in a valve that controls fluid or fluid pressure.

Another objective of the present invention is to provide a valve seat apparatus which utilizes a material that possesses enough of an elastic and conforming nature that it can provide a sealing surface yet sustain sufficient mechanical rigidity to transmit an actuating force and permit stable connection to required components.

Yet another objective of this invention is to provide a valve seat apparatus that is relatively simple to form and manufacture.

A further objective of this invention is to provide a valve seat apparatus that is comparatively inexpensive to produce.

An even further objective of this invention is to provide a valve seat apparatus which will enable production of a fluid-controlling valve that is potentially more reliable.

A yet further objective of this invention is to provide a valve seat apparatus which eliminates the need to bond a separate elastomer sealing member to a rigid carrier to create such valve seat apparatus.

In addition to the objectives and advantages listed above, various other objectives and advantages of the present invention will become more readily apparent to persons skilled in the relevant art from a reading of the detailed description section of this document. The other objectives and advantages will become particularly apparent when the detailed description is considered along with the attached drawings and the appended claims.

THE DRAWINGS

DETAILED DESCRIPTION OF THE INVENTION

Figure 1:
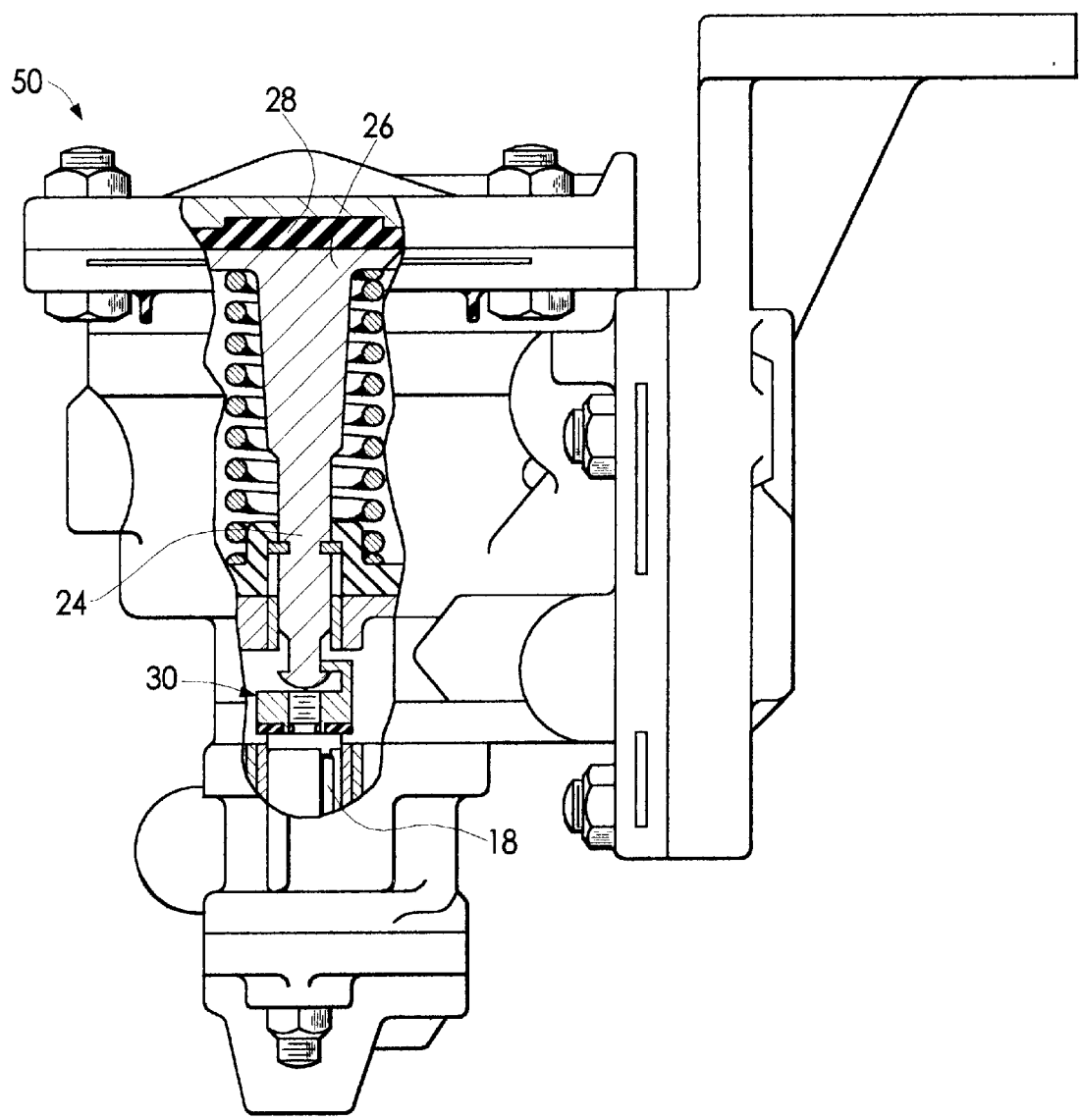
FIG. 1 is partial cross-sectional view of a Relayair control valve that is part of a 26L locomotive braking system which includes the prior art valve seat and sealing member.

Before describing the present invention in detail, for the sake of clarity and understanding, the reader is advised that identical components having identical functions in each of the accompanying drawings have been marked with the same reference numerals throughout each of the several figures illustrated herein.

Figure 2:
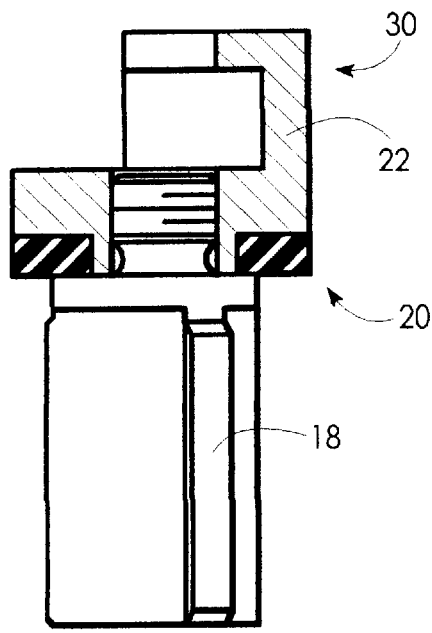
FIG. 2 is an enlarged partial cross-sectional view of prior art illustrated in FIG. 1.

FIG. 1 shows the valve seat apparatus, generally designated 30, of the prior art attached to stem 24, which is engaged by diaphragm 28. Attached to valve seat apparatus 30 is valve seat guide 18. In FIG. 2, valve seat guide 18 is shown in detail as threadably attached to carrier 22. Carrier 22 is formed from a metallic or similarly suitable material and a sealing member, generally designated 20, formed from rubber or a suitable elastomer, is joined to carrier 22.

Figure 3:
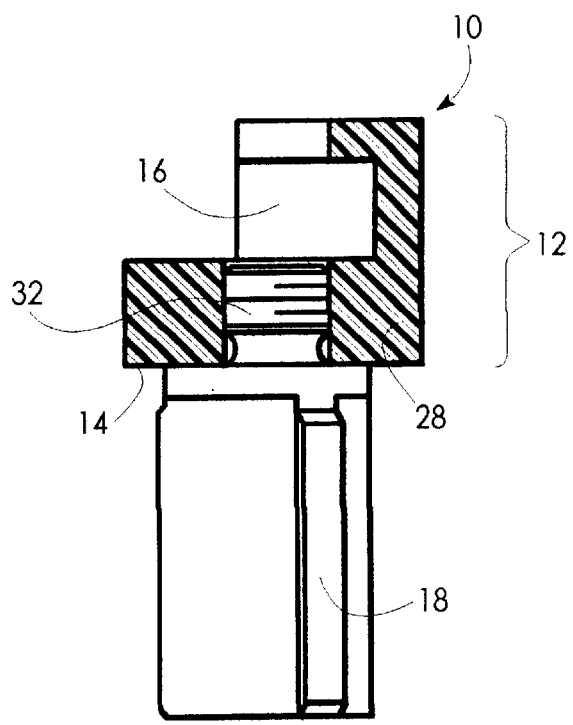
FIG. 3 is a partial cross-sectional view of a presently preferred embodiment of the present invention as it would be used in a 26-L relay valve.

Reference is now made, more particularly, to FIG. 3. Illustrated thereon is a valve seat assembly, generally designated 10. Valve seat assembly 10 includes valve seat apparatus 12, formed from one contiguous material, preferably polytetrafluoroethylene (PTFE) with a 25% glass filler. Valve seat apparatus 12 includes sealing surface 14 and recessed area 16. Recessed area 16 is machined or formed into valve seat apparatus 12 to provide a means of connection to actuating stem 24 engageable with a diaphragm or moveable by a solenoid in a valve. Recessed area 16 is generally shaped to fit to a formed area at the end of the actuating stem 24, such as is found on a Relayair valve on a 26-L braking system. Threads 32 are formed into carrier portion 28 to allow for attachment of guide 18. The lower surface of carrier portion 28, shown as sealing surface 14, is not a separate component but is suitably machined, polished or otherwise finished into the lower face of the carrier portion 28 so as to suitably mate with the corresponding sealing seat of a valve. Consequently, other than the threadably attached guide 18, the valve seat apparatus 10 is formed as one contiguous component. The preselected plastic material of which the valve seat apparatus 10 is composed may be made from either a petroleum based elastomer, a synthetic elastomer, a natural elastomer or various combinations thereof. The material selected may be combined with a filler to enhance or manifest desired physical properties. Also, the material selected generally must possess sufficient lubricity to allow relatively free movement of the valve seat apparatus 10 within the valve housing.

The present invention has been set forth in detail according to the Patent Act, and those persons of ordinary skill in the technical art to which this invention pertains will recognize various alternative ways of practicing the invention without departing from the spirit and scope of the appended claims. Those of ordinary skill in the relevant art will also recognize that the foregoing description is merely illustrative and is not intended to limit any of the following claims to any particular narrow interpretation.

We claim:

1. A valve seat apparatus that provides both a sealing surface and carrier portion formed as one contiguous component, said valve seat apparatus engageable with a stem assembly within a valve housing, wherein interaction between said valve seat apparatus and a corresponding sealing member within said valve housing control flow of fluid and fluid pressure, said valve seat apparatus comprising a preselected plastic material that possesses at least sufficient mechanical rigidity for stable attachment to said stem assembly and to act as a carrier to transmit an actuating force and provide a resilient sealing surface to mate with said corresponding sealing member.

2. A valve seat apparatus, as recited in claim 1, wherein said preselected plastic material is at least one of molded and machined for attachment to said stem assembly.

3. A valve seat apparatus, as recited in claim 1, wherein said resilient sealing surface is formed by at least one of molding, machining and polishing said preselected plastic material.

4. A valve seat apparatus, as recited in claim 1, wherein said preselected plastic material provides at least sufficient lubricity to allow free movement of said valve seat apparatus within said valve housing.

5. A valve seat apparatus, as recited in claim 1, wherein said preselected plastic material is selected from the group consisting of petroleum based elastomers, synthetic elastomers, natural elastomers, and various combinations thereof.

6. A valve seat apparatus, as recited in claim 5, wherein said preselected plastic material further includes a filler.

7. A valve seat apparatus, as recited in claim 5, wherein said preselected plastic material is a synthetic elastomer.

8. A valve seat apparatus, as recited in claim 7, wherein said synthetic elastomer is one of polytetraflouroethelene and acetyl.

9. A valve seat apparatus, as recited in claim 8, wherein said polytetraflouroethelene is combined with a glass filler.

10. A valve seat apparatus, as recited in claim 9, wherein said filler content is between about 20 and about 30 percent.

11. A valve seat apparatus, as recited in claim 1, wherein said preselected plastic material is chemical resistant.

12. A valve seat apparatus, as recited in claim 1, wherein said preselected plastic material is abrasion resistant.

13. In combination with a valve having a valve housing, a diaphragm and stem with an attached carrier having a sealing surface disposed thereon wherein the improvement comprises a valve seat apparatus that provides both a sealing surface and a carrier portion formed as one contiguous component, said valve seat apparatus engageable with a stem assembly within said valve housing, wherein interaction between said valve seat apparatus and a corresponding sealing member within said valve housing control flow of fluid and fluid pressure, said valve seat apparatus having a preselected plastic material that possesses at least sufficient mechanical rigidity for stable attachment to said stem assembly and to act as a carrier to transmit an actuating force and provide a resilient sealing surface to mate with said corresponding sealing member.

14. A valve seat apparatus, as recited in claim 13, wherein said preselected plastic material is at least one of molded and machined for attachment to said stem assembly.

15. A valve seat apparatus, as recited in claim 13, wherein said resilient sealing surface is formed by at least one of molding, machining and polishing said preselected plastic material.

16. A valve seat apparatus, as recited in claim 13, wherein said preselected plastic material provides at least sufficient lubricity to allow free movement of said valve seat apparatus within said valve housing.

17. A valve seat apparatus, as recited in claim 13, wherein said preselected plastic material is selected from the group consisting of petroleum based elastomers, synthetic elastomers, natural elastomers, and various combinations thereof.

18. A valve seat apparatus, as recited in claim 17, wherein said preselected plastic material further includes a filler.

* * * * *